(12) United States Patent
Linder

(10) Patent No.: US 12,122,612 B2
(45) Date of Patent: Oct. 22, 2024

(54) REMOVAL APPARATUS FOR REMOVING TUBE PIECES, LOAD SYSTEM HAVING THE REMOVAL APPARATUS AND METHOD FOR REMOVING TUBE PIECES IN THE REMOVAL APPARATUS

(71) Applicant: TRUMPF Werkzeugmaschinen SE + Co. KG, Ditzingen (DE)

(72) Inventor: Bernd Linder, Gammertingen (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 87 days.

(21) Appl. No.: 17/861,447

(22) Filed: Jul. 11, 2022

(65) Prior Publication Data

US 2022/0340372 A1    Oct. 27, 2022

Related U.S. Application Data

(63) Continuation of application No. PCT/EP2020/087594, filed on Dec. 22, 2020.

(30) Foreign Application Priority Data

Jan. 10, 2020 (DE) .................... 10 2020 100 459.1

(51) Int. Cl.
B65G 47/14 (2006.01)

(52) U.S. Cl.
CPC ..... *B65G 47/1414* (2013.01); *B65G 47/1442* (2013.01)

(58) Field of Classification Search
None
See application file for complete search history.

(56) References Cited

U.S. PATENT DOCUMENTS 3,754,671 A * 8/1973 Walda .................... B65G 65/23
414/404
3,767,073 A * 10/1973 DeGreef ................ B65B 69/00
414/421

(Continued)

FOREIGN PATENT DOCUMENTS

CN       101628658 A     1/2010
CN       203187045 U     9/2013

(Continued)

*Primary Examiner* — William R Harp
(74) *Attorney, Agent, or Firm* — Laurence A. Greenberg; Werner H. Stemer; Ralph E. Locher

(57) ABSTRACT

A removal apparatus removes tube pieces and has a receiving device with a loading edge and a receiving region for receiving the tube pieces and a loading surface connecting the loading edge to the receiving region. The loading surface is inclined a direction from the loading edge to the receiving region about an angle of inclination. A pivotable storage cassette stores a multiplicity of tube pieces and is arranged in front of the loading edge and is configured to be pivoted about a pivot angle of the storage cassette in relation to a parallel of the horizontal. A lifter is provided for lifting the tube pieces out of the storage cassette and is configured to be moved in front of the loading edge such the lifter lifts the tube pieces onto the loading edge such that the tube pieces move along the loading surface into the receiving region.

17 Claims, 1 Drawing Sheet

(56) References Cited

U.S. PATENT DOCUMENTS

| | | | | |
|---|---|---|---|---|
| 4,776,742 A | * | 10/1988 | Felder | B65G 59/08 |
| | | | | 414/416.09 |
| 4,802,810 A | * | 2/1989 | Gunn | B65G 59/08 |
| | | | | D34/28 |
| 4,936,736 A | | 6/1990 | Meier | |
| 8,113,762 B2 | | 2/2012 | Belik | |
| 9,415,949 B2 | * | 8/2016 | Buse | B65G 47/52 |
| 2002/0098073 A1 | | 7/2002 | Drei et al. | |

FOREIGN PATENT DOCUMENTS

| | | |
|---|---|---|
| CN | 205802230 U | 12/2016 |
| CN | 206395417 U | 8/2017 |
| CN | 107618833 A | 1/2018 |
| CN | 110127351 A | 8/2019 |
| DE | 661715 C | 6/1938 |
| DE | 3403029 A1 | 8/1985 |
| DE | 3812529 A1 | 10/1989 |
| DE | 69734891 T2 | 7/2006 |
| EP | 1916379 B1 | 5/2010 |
| EP | 2368818 A1 | 9/2011 |
| JP | 2000128339 A | 5/2000 |

\* cited by examiner

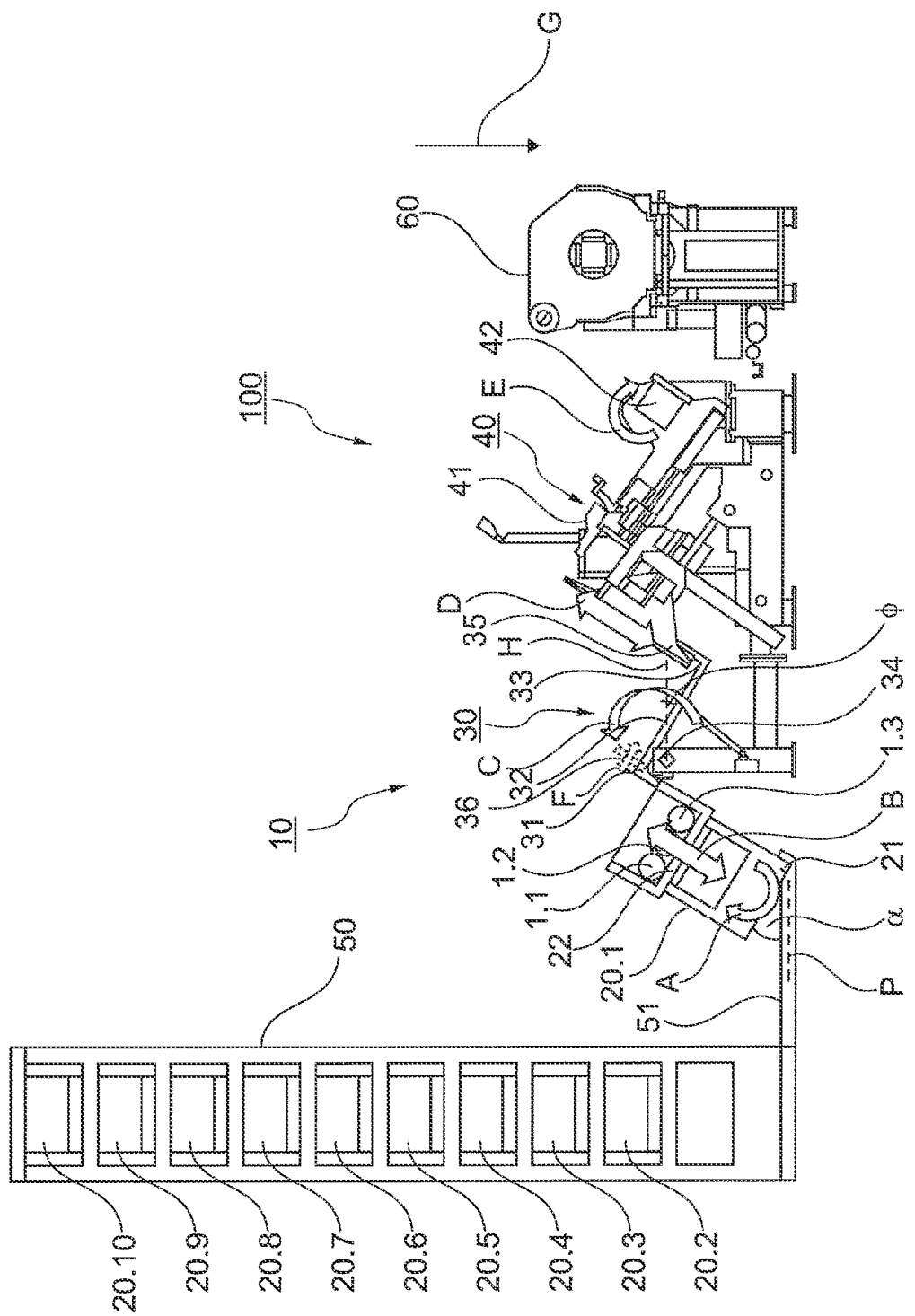

REMOVAL APPARATUS FOR REMOVING TUBE PIECES, LOAD SYSTEM HAVING THE REMOVAL APPARATUS AND METHOD FOR REMOVING TUBE PIECES IN THE REMOVAL APPARATUS

CROSS-REFERENCE TO RELATED APPLICATION

This application is a continuation, under 35 U.S.C. § 120, of copending International Patent Application PCT/EP2020/087594, filed Dec. 22, 2020, which designated the United States; this application also claims the priority, under 35 U.S.C. § 119, of German Patent Application DE 10 2020 100 459.1 filed Jan. 10, 2020; the prior applications are herewith incorporated by reference in their entirety.

FIELD AND BACKGROUND OF THE INVENTION

The invention relates to a removal apparatus for removing tube pieces according to the preamble of the independent removal apparatus claim. Furthermore, the invention relates to a loading system with such a removal apparatus and to a method for removing tube pieces in the removal apparatus or the loading system.

Published, non-prosecuted German patent application DE 3403029 A1 discloses a removal apparatus having features of the preamble of the independent removal apparatus claim. Pincers which pick up and clamp the tube piece are provided for lifting and for individually removing tube pieces from the storage cassette. The remaining tube pieces are returned to the storage cassette.

A disadvantage of this known removal apparatus is that it is of complicated construction and is therefore costly. Furthermore, removal by means of the removal apparatus is very time-consuming and energy-intensive, since the storage cassette has to be pivoted back after each removal of an individual tube piece and the lifter has to be moved back in order to receive the multiplicity of tube pieces. Furthermore, handling with the pincers is cumbersome and error-prone. Changing to tube pieces of different geometry or size may necessitate elaborate reprogramming and costly conversion of the removal apparatus. Finally, the storage cassette has to be available for the entire duration of the removal of the individual tube pieces from the multiplicity of tube pieces and during this time cannot be used for other purposes or cannot already receive further tube pieces.

SUMMARY OF THE INVENTION

It is the object of the invention to reduce the disadvantages of the removal apparatuses known from the prior art, in particular to provide a removal apparatus which enables tube pieces to be removed quickly, reliably and inexpensively.

The object is achieved by a removal apparatus according to the independent removal apparatus claim. Accordingly, a removal apparatus is proposed for removing tube pieces, in particular individual tube pieces from a multiplicity of tube pieces. The removal apparatus has: a receiving device with a loading edge, a receiving region for receiving the tube pieces and a loading surface connecting the loading edge to the receiving region, and a pivotable storage cassette for storing a multiplicity of tube pieces. The storage cassette is arranged or being able to be arranged in front of the loading edge of the receiving device and the storage cassette arranged in front of the loading edge being configured to be pivoted about a pivot angle of the storage cassette in relation to a parallel of the horizontal in front of the loading edge of the receiving device. A lifter is provided for lifting the multiplicity of tube pieces out of the storage cassette, the lifter being configured to be moved in front of the loading edge of the receiving device in such a manner that the lifter lifts the multiplicity of tube pieces onto the loading edge such that the multiplicity of tube pieces move along the loading surface into the receiving region. The loading surface can be inclined in a direction from the loading edge to the receiving region independently of the storage cassette about a variable angle of inclination in relation to a horizontal in the direction of gravity and in relation to the storage cassette and/or the receiving device has a slide unit which limits the speed of movement of the tube pieces along the loading surface.

Owing to the fact that the loading surface can be inclined in a direction from the loading edge to the receiving region independently of the storage cassette about a variable angle of inclination in relation to a horizontal in the direction of gravity and in relation to the storage cassette, a particularly fast, reliable and cost-effective unloading of the tube pieces from the pivotable storage cassette into the receiving region is made possible. The movement speed of the tube pieces can be influenced depending on the set angle of inclination in order to enable controlled unloading of the tube pieces. The fact that the loading surface can be inclined can mean, in particular, that the receiving device is pivotable, and therefore the angle of inclination of the loading surface is adjustable. The pivotability of the receiving device can be realized in particular pneumatically. Adjusting the angle of inclination makes it possible to specifically influence the movement of the tube pieces from the loading edge into the receiving region. For example, it may be expedient to adapt the angle of inclination accordingly for different sizes and/or geometries of tube pieces in order to move the tube pieces quickly and reliably into the receiving region.

As an alternative or in addition, the slide unit enables the tube pieces to be unloaded into the receiving region with a limited movement speed and therefore safely and reliably. For this purpose, the slide unit can be configured as a slide unit which is movable linearly on the loading surface. The slide unit can in particular be configured to take over the tube pieces after the loading edge and to convey them in the direction of the receiving region. In the process, the tube pieces slide and/or roll into the receiving region. The slide unit can also be used to convey tube pieces from the receiving region back into the storage cassette.

It can be provided that the removal apparatus also has a lifting slide which is arranged or can be arranged at the receiving region and is configured to remove individual tube pieces from a multiplicity of tube pieces in the receiving region by lifting. The removal apparatus can thus also be referred to as a removal apparatus for removing individual tube pieces from a multiplicity of tube pieces.

The fact that the tube pieces are first moved into the receiving region, from where they are removed individually using the lifting slide, allows the individual tube pieces to be removed quickly, continuously and reliably. The storage cassette only has to be pivoted once and the lifter only has to be displaced once. The removal apparatus thus makes it possible for the individual tube pieces to be removed quickly, reliably and inexpensively from the multiplicity of tube pieces.

The lifter can be arranged in particular on a base of the storage cassette, or the lifter can encompass the base of the storage cassette, with the multiplicity of tube pieces resting on the base. The lifter is then displaced within the storage cassette in order to lift out the multiplicity of tube pieces, in particular tube layer by tube layer.

The lifting slide is configured in such a way that it in each case only lifts one individual tube piece from the multiplicity of tube pieces. In order to achieve this, a lifting surface of the lifting slide, on which the individual tube piece rests during lifting, can be dimensioned in such a way that only one individual tube piece can be arranged on the lifting surface.

The multiplicity of tube pieces is sorted as a bundle of tube pieces into the receiving region. In this respect, the receiving region is capable of receiving a plurality of tube pieces, i.e., a bundle of tube pieces. The receiving region can have a V-shaped or U-shaped cross section, for example.

The removal apparatus can in particular have a control device which is configured to control the removal apparatus. The control device can be configured to control the receiving device, the storage cassette, the lifter and/or the lifting slide in order to carry out in each case the method steps explained above and also below.

Furthermore, it can be provided that the removal apparatus is configured to reduce the angle of inclination of the loading surface before the lifter lifts the multiplicity of tube pieces onto the loading edge, and to increase the angle of inclination of the loading surface after the multiplicity of tube pieces has moved into the receiving region. Reducing the angle of inclination has the effect that the multiplicity of tube pieces is particularly reliably moved into the receiving region. Furthermore, this can prevent the tube pieces from impacting against the lift slide at a high speed when the lift slide is arranged in or at the receiving region. By increasing the angle of inclination, the receiving device can finally pass again into the starting position for removing the individual tube pieces.

It can be provided that the removal apparatus is configured to incline the loading surface in a direction from the receiving region to the loading edge by an angle of inclination in relation to the horizontal in the direction of gravity such that tube pieces located in the receiving region move into the storage cassette. This allows the tube pieces to be moved back into the storage cassette. This saves a manual repositioning of the tube pieces if the tube pieces to be processed are to be changed in terms of, for instance, material, size or geometry and there are still tube pieces in the receiving region that are now no longer to be processed at least prematurely.

It can also be provided that the lifter, the slide unit and/or the lifting slide are designed to be linearly movable. The lifter, the slide unit and/or the lifting slide can thus have linear drives. This enables a cost-effective design of the lifter, slide unit and/or lifting slide and simple handling of the tube pieces.

Furthermore, it can be provided that the lifter and the storage cassette are configured to be pivoted together about the pivot angle. Accordingly, it can be provided that the lifter is designed to be stationary in relation to the storage cassette, and therefore the lifter is always pivoted along with the pivot angle. As a result, it is also not necessary to position the lifter itself obliquely in relation to the storage cassette. Thus, the lifter or a base of the storage cassette moved by the lifter can run with its contact surface in particular at a right angle in relation to walls of the storage cassette. This prevents the tube pieces from being scratched as they are lifted, when the lifter is tilted in relation to the storage cassette.

In addition, it can be provided that the pivot angle is in the range of 15° to 45°. In particular, the pivot angle can be in the range from 20° to 40°. A pivot angle in these ranges has proven to be advantageous for reliably moving the multiplicity of tube pieces from the storage cassette into the receiving region.

Furthermore, it can be provided that the removal apparatus has a shelf and a storage and retrieval device for removing the storage cassette from the shelf and/or for transferring tube pieces from the shelf into the storage cassette. The shelf can be formed with a plurality of storage cassettes or shelf compartments for storing tube pieces. In terms, for example, of size, in particular length, material and shape, different tube pieces can be stored in different storage cassettes or shelf compartments and can be removed by the storage and retrieval device as required. The store can be configured as a storage tower with a plurality of storage cassettes or shelf compartments stacked one on top of the other. The store can in particular be constructed modularly. In this way, the store can be configured to be extendable, in particular in terms of height, by further storage cassettes and shelf compartments. It is possible to arrange a plurality of, for example two, stores next to one another. Furthermore, the removal apparatus can have a plurality of receiving devices and lifting slides, for example in each case two. In this way, different receiving devices can be supplied with storage cassettes with tube pieces stored therein and supplied for processing in a tube processing machine.

The storage cassette can in particular be designed to be movable. For example, the storage cassette can be arranged on rails so that it can be rolled. The storage cassette can then be arranged in front of the loading edge of the receiving device by moving the storage cassette appropriately.

Finally, it can also be provided that the receiving region is dimensioned in relation to the storage cassette in such a way that all the tube pieces of the multiplicity of tube pieces that can be received in the storage cassette can be received in the receiving region. This makes it possible for the storage cassette to be completely emptied or for the receiving region to receive all the tube pieces stored in the storage cassette. In this way, the receiving region is sufficiently supplied for the subsequent individual removal of the tube pieces and the storage cassette becomes free. For example, the storage cassette can already be loaded with new tube pieces for further removal and subsequent processing.

The object mentioned at the beginning is also achieved by a loading system for loading a tube processing machine with individual tube pieces, the loading system having the removal apparatus and a loading apparatus, the loading apparatus having a pivotable gripper which is configured to grip individual tube pieces from the receiving region and to move them to the tube processing machine. In particular, the pivotable gripper can be configured to grip the individual tube piece removed by means of the lifting slide and to move it to the tube processing machine.

In this way, the tube pieces can be fed easily and quickly to the tube processing machine. The tube processing machine can in particular have a laser for laser cutting of the tube pieces.

It can be provided that the loading system has a length measuring device for measuring a length of the individual tube pieces. This makes it possible to fix the individual tube pieces in the tube processing machine at a correct distance from a processing point of the tube processing machine.

The object mentioned at the outset is also achieved by a method for removing tube pieces in the removal apparatus or in the loading system, the method having the steps: storing tube pieces in the storage cassette, arranging and pivoting the storage cassette in front of the loading edge of the receiving device, lifting the multiplicity of tube pieces out of the storage cassette onto the loading edge of the receiving device, and moving the multiplicity of tube pieces from the loading edge into the receiving region.

It can be provided in particular that all the tube pieces of the multiplicity of tube pieces are moved from the storage cassette into the receiving region. Furthermore, it can be provided that the tube pieces move, in particular mainly or solely, through the action of gravitational force into the receiving region.

A method for removing individual tube pieces from a multiplicity of tube pieces can also be provided, having the steps of the method for removing tube pieces in the removal apparatus or in the loading system and also having the step of removing an individual tube piece in the receiving region by lifting using the lifting slide.

It can also be provided that the method also has the steps of reducing the angle of inclination of the loading surface before the lifter lifts the multiplicity of tube pieces onto the loading edge, and increasing the angle of inclination of the loading surface after the multiplicity of tube pieces have moved into the receiving region. Reducing the angle of inclination has the effect that the multiplicity of tube pieces is particularly reliably moved into the receiving region. Furthermore, this can prevent the tube pieces from impacting against the lift slide at a high speed when the lift slide is arranged in or at the receiving region. By increasing the angle of inclination, the receiving device can finally pass again into the starting position for removing the individual tube pieces.

It can also be provided that the method also has the step of: inclining the loading surface in a direction from the receiving region to the loading edge about an angle of inclination in relation to the horizontal in the direction of gravity and/or displacing the slide unit along the loading surface from the receiving region to the loading edge such that tube pieces located in the receiving region move into the storage cassette. This allows the tube pieces to be moved back into the storage cassette. This saves a manual repositioning of the tube pieces if the tube pieces to be processed are to be changed in terms of, for instance, material, size or geometry and there are still tube pieces in the receiving region that are now no longer to be processed at least prematurely.

Other features which are considered as characteristic for the invention are set forth in the appended claims.

Although the invention is illustrated and described herein as embodied in a removal apparatus for removing tube pieces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The single FIGURE of the drawing is a schematic side view of an exemplary embodiment of a loading system for a tube processing machine with a removal apparatus according to the invention.

DETAILED DESCRIPTION OF THE INVENTION

Referring now to the single FIGURE of the drawing in detail, there is shown a removal apparatus 10 shown in the FIGURE contains a plurality of storage cassettes 20.1, 20.2, 20.3, 20.4, 20.5, 20.6, 20.7, 20.8, 20.9, 20.10, a store 50 and a receiving device 30. A loading system 100 shown in the FIGURE contains the removal apparatus 10 and a loading apparatus 40.

In the present case, the storage cassettes 20.2, 20.3, 20.4, 20.5, 20.6, 20.7, 20.8, 20.9, 20.10 are stored in the store 50, while the storage cassette 20.1 is arranged on the receiving device 30. For this purpose, the storage cassette 20.1 has been moved on a rail 51 in front of the receiving device 30. A multiplicity of tube pieces 1.1, 1.2, 1.3 are located in the storage cassette 20.1. These are to be removed individually from the storage cassette 20.1 in order to load a tube processing machine 60 with them.

For this purpose, the storage cassette 20.1 is displaced about a first pivot point 21 in the direction of the arrow A by a pivot angle $\alpha$ in relation to the rail 51 or the floor or a line P. The pivot angle $\alpha$ is 30° in the present case. A lifter 22 is linearly movable within the storage cassette 20.1 and, by moving in the direction of the receiving device 30 or the arrow B, lifts all the tube pieces 1.1, 1.2, 1.3 stored in the storage cassette 20.1.

As soon as the lifter 22 reaches a loading edge 31 of the receiving device 30, the tube pieces 1.1, 1.2, 1.3 arranged in an uppermost row of the storage cassette 20.1 move out of the storage cassette 20.1 along a loading surface 32 of the receiving device 30 into a receiving region 33 of the receiving device 30. This occurs solely by means of gravity acting in the direction of gravity G. For this purpose, the loading surface 32 is inclined in a direction from the loading edge 31 to the receiving region 33 in relation to a horizontal H in the direction of gravity G by an angle of inclination $\phi$. The horizontal H is parallel to the floor. The horizontal is also perpendicular to the direction of gravity G or the gravitational field lines (running in the direction of gravity G). The line P is a parallel P of the horizontal H. A further movement of the lifter 22 can be used to move further tube pieces 1 arranged in a next row in the storage cassette 20.1 over the loading edge 31 onto the loading surface 32.

The angle of inclination $\phi$ is adjustable about a second pivot point 34 by pivoting the receiving device 30. The pivoting can take place pneumatically in particular. By pivoting in the direction of the arrow C, the speed of movement at which the tube pieces 1.1, 1.2, 1.3 slide along the loading surface 32 of the receiving device 30 into the receiving region 33 can be changed. For example, when loading rectangular profiles, a larger angle of inclination $\phi$ can be set than when loading round tubes as tube pieces. In addition, the tube pieces 1.1, 1.2, 1.3, when they have been moved into the receiving region 33, can also be moved back again in the storage cassette 20.1. Otherwise, the storage cassette 20.1 that has been taken out, for example if it has been completely unloaded, can be moved to the store 50 and one of the storage cassettes 20.2, 20.3, 20.4, 20.5, 20.6, 20.7, 20.8, 20.9, 20.10 storing other tube pieces 1 can be removed by means of a storage and retrieval device, not shown, and arranged on the receiving device 30.

Furthermore, the receiving device 30 can additionally have a slide unit 36 which is configured to be linearly movable along the loading surface 32. In order to convey the tube pieces 1 from the loading edge 31 into the receiving region 33 in a particularly controlled manner, the slide unit 36 can be gradually displaced in a direction from the loading edge 31 to the receiving region 33. The tube pieces 1 lie on the slide unit 36 and are conveyed together with the slide unit 36 into the receiving region 33 by means of gravity and the inclination of the loading surface 32. Similarly, the slide unit 36 can be moved in a direction from the receiving region 33 to the loading edge 31 in order to move tube pieces 1 from the receiving region 33 back into the storage cassette 20. The linear mobility of the slide unit 36 in the two directions mentioned is indicated by the arrow F.

The slide unit 36 can also be used by itself to control the speed of movement of the tube pieces 1. In such an alternative configuration of the removal apparatus 10, the receiving device 30 is not configured to be pivotable, but rather is arranged with a fixed angle of inclination ϕ in the removal apparatus 10.

Similarly, the removal apparatus 10 can be configured without a slide unit 36 such that the speed of movement of the tube pieces 1 is controlled solely by the variable angle of inclination ϕ of the pivotable receiving device 30.

Finally, an individual tube piece 1 is removed from the multiplicity of tube pieces 1.1, 1.2, 1.3 in the receiving region 33 by lifting in the direction of the arrow D by means of a linearly movable lifting slide 35, which is arranged at the receiving region 33.

The tube piece 1 separated in this way is supplied to the loading apparatus 40. A gripper 41 grips the separated tube piece 1 and moves it by pivoting about a third pivot point 42 in the direction of the arrow E to the tube processing machine 60. In the tube processing machine 60, the separated tube piece 1 is finally processed.

The invention claimed is:

1. A removal apparatus for removing tube pieces, the removal apparatus comprising:
    a receiving device with a loading edge, a receiving region for receiving the tube pieces and a loading surface connecting said loading edge to said receiving region;
    a pivotable storage cassette for storing a plurality of the tube pieces, said pivotable storage cassette being disposed or being able to be disposed in front of said loading edge of said receiving device and said pivotable storage cassette disposed in front of said loading edge being configured to be pivoted about a pivot angle of said pivotable storage cassette in relation to a parallel of a horizontal in front of said loading edge of said receiving device;
    a lifter for lifting the plurality of tube pieces out of said pivotable storage cassette, said lifter configured to be moved in front of said loading edge of said receiving device such that said lifter lifts the plurality of tube pieces onto said loading edge such that the plurality of tube pieces move along said loading surface into said receiving region; and
    said receiving device having a slide unit which limits a speed of movement of the tube pieces along said loading surface.

2. The removal apparatus according to claim 1, further comprising a lifting slide which is disposed or can be disposed at said receiving region and is configured to remove individual ones of the tube pieces from the plurality of tube pieces in said receiving region by lifting.

3. The removal apparatus according to claim 2, wherein said loading surface is constructed to be inclined in a direction from said loading edge to said receiving region independently of said pivotable storage cassette about a variable angle of inclination in relation to the horizontal in a direction of gravity and in relation to said pivotable storage cassette and the removal apparatus is configured to reduce the variable angle of inclination of said loading surface before said lifter lifts the plurality of tube pieces onto said loading edge, and to increase the variable angle of inclination of said loading surface after the plurality of tube pieces has moved into said receiving region.

4. The removal apparatus according to claim 2, wherein said loading surface is constructed to be inclined in a direction from said loading edge to said receiving region independently of said pivotable storage cassette about a variable angle of inclination in relation to the horizontal in a direction of gravity and in relation to said pivotable storage cassette said removal apparatus is configured to incline said loading surface in a direction from said receiving region to said loading edge by the variable angle of inclination in relation to the horizontal in the direction of gravity such that the tube pieces disposed in said receiving region move into said pivotable storage cassette.

5. The removal apparatus according to claim 2, wherein said lifter and/or said lifting slide and/or said slide unit are configured to be linearly movable.

6. The removal apparatus according to claim 1, wherein said lifter and said pivotable storage cassette are configured to be pivoted together about the pivot angle.

7. The removal apparatus according to claim 6, wherein the pivot angle is in a range of 15° to 45°.

8. The removal apparatus according to claim 1, wherein said receiving region is dimensioned in relation to said pivotable storage cassette such that all the tube pieces of the plurality of tube pieces that are received in said pivotable storage cassette are received in said receiving region.

9. The removal apparatus according to claim 1, wherein said slide unit is disposed above said loading surface and is configured to be linearly movable along said loading surface.

10. The removal apparatus according to claim 1, wherein said receiving device is arranged in the removal apparatus with a fixed angle of inclination.

11. A removal apparatus for removing tube pieces, the removal apparatus comprising:
    a receiving device with a loading edge, a receiving region for receiving the tube pieces and a loading surface connecting said loading edge to said receiving region;
    a pivotable storage cassette for storing a plurality of the tube pieces, said pivotable storage cassette being disposed or being able to be disposed in front of said loading edge of said receiving device and said pivotable storage cassette disposed in front of said loading edge being configured to be pivoted about a pivot angle of said pivotable storage cassette in relation to a parallel of a horizontal in front of said loading edge of said receiving device;
    a lifter for lifting the plurality of tube pieces out of said pivotable storage cassette, said lifter configured to be moved in front of said loading edge of said receiving device such that said lifter lifts the plurality of tube pieces onto said loading edge such that the plurality of tube pieces move along said loading surface into said receiving region; and
    said loading surface can be inclined in a direction from said loading edge to said receiving region independently of said pivotable storage cassette about a variable angle of inclination in relation to the horizontal in a direction of gravity and in relation to said pivotable storage cassette and/or said receiving device having a slide unit which limits a speed of movement of the tube pieces along said loading surface;

a shelf and a storage and retrieval device for removing said pivotable storage cassette from said shelf and/or for transferring the tube pieces from said shelf in said pivotable storage cassette.

12. A loading system for loading a tube processing machine with individual tube pieces, the loading system comprising:
   the removal apparatus according to claim 1; and
   a loading apparatus having a pivotable gripper which is configured to grip individual ones of the tube pieces and to move them to the tube processing machine.

13. The loading system according to claim 12, further comprising a length measuring device for measuring a length of the individual tube pieces.

14. A method for removing tube pieces in a removal apparatus or in a loading system having the removal apparatus, which comprises the steps of:
   providing the removal apparatus according to claim 1;
   storing the plurality of tube pieces in the pivotable storage cassette;
   arranging and pivoting the pivotable storage cassette in front of the loading edge of the receiving device;
   lifting the plurality of tube pieces out of the pivotable storage cassette onto the loading edge of the receiving device; and
   moving the plurality of tube pieces from the loading edge into the receiving region.

15. The method according to claim 14, which further comprises removing an individual one of the tube pieces in the receiving region by lifting using a lifting slide of the removal apparatus.

16. The method according to claim 14, which further comprises reducing the variable angle of inclination of the loading surface before the lifter lifts the plurality of tube pieces onto the loading, and increasing the variable angle of inclination of loading surface after the plurality of pieces have moved into the receiving region.

17. The method according to claim 14, which further comprises:
   inclining the loading surface in a direction from the receiving region to the loading edge about the variable angle of inclination in relation to the horizontal in the direction of gravity; and/or
   displacing the slide unit along the loading surface from the receiving region to the loading edge such that the tube pieces located in the receiving region move into the pivotable storage cassette.

* * * * *